(12) United States Patent
Sun et al.

(10) Patent No.: US 12,288,164 B2
(45) Date of Patent: Apr. 29, 2025

(54) PREDICTION METHOD FOR STALL AND SURGE OF AXIAL COMPRESSOR BASED ON DEEP LEARNING

(71) Applicant: DALIAN UNIVERSITY OF TECHNOLOGY, Liaoning (CN)

(72) Inventors: Ximing Sun, Liaoning (CN); Fuxiang Quan, Liaoning (CN); Hongyang Zhao, Liaoning (CN); Yanhua Ma, Liaoning (CN); Pan Qin, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 995 days.

(21) Appl. No.: 17/312,278

(22) PCT Filed: Sep. 28, 2020

(86) PCT No.: PCT/CN2020/118335
§ 371 (c)(1),
(2) Date: Jun. 9, 2021

(87) PCT Pub. No.: WO2021/248746
PCT Pub. Date: Dec. 16, 2021

(65) Prior Publication Data
US 2022/0092428 A1    Mar. 24, 2022

(30) Foreign Application Priority Data

Jun. 10, 2020 (CN) .......................... 202010521798.X
Sep. 15, 2020 (CN) .......................... 202010963798.5

(51) Int. Cl.
*G06N 3/084*    (2023.01)
*G06N 3/045*    (2023.01)

(52) U.S. Cl.
CPC .............. *G06N 3/084* (2013.01); *G06N 3/045* (2023.01)

(58) Field of Classification Search
CPC ........ G06N 3/084; G06N 3/045; G06N 3/048; G06N 3/08; Y02T 90/00; G06F 30/27; G06F 30/15
See application file for complete search history.

(56) References Cited

U.S. PATENT DOCUMENTS 6,098,010 A    1/2000 Krener et al.

FOREIGN PATENT DOCUMENTS

| CN | 110608187 A | * 12/2019 | ........... F04D 27/001 |
| CN | 110848166 A | 2/2020 | |

(Continued)

OTHER PUBLICATIONS

P. Lin, C. Wang and T. Chen, "A Stall Warning Scheme for Aircraft Engines With Inlet Distortion via Deterministic Learning," in IEEE Transactions on Control Systems Technology, vol. 26, No. 4, pp. 1468-1474, Jul. 2018. (Year: 2018).*

Zhang Zhongyang and Wang Cong, "Research on hybrid parallel algorithm in detection of rotating stall," 2016 2nd IEEE International Conference on Computer and Communications (ICCC), Chengdu, 2016, pp. 1217-1221. (Year: 2016).*

(Continued)

*Primary Examiner* — Alexey Shmatov
*Assistant Examiner* — Clint Mullinax
(74) *Attorney, Agent, or Firm* — Muncy, Geissler, Olds & Lowe, P.C.

(57) ABSTRACT

The present invention relates to a prediction method for stall and surge of an axial compressor based on deep learning. The method comprises the following steps: firstly, preprocessing data with stall and surge of an aeroengine, and partitioning a test data set and a training data set from experimental data. Secondly, constructing an LR branch network module, a WaveNet branch network module and a LR-WaveNet prediction model in sequence. Finally, conducting real-time prediction on the test data: preprocessing (Continued)

test set data in the same manner, and adjusting data dimension according to input requirements of the LR-WaveNet prediction model; giving surge prediction probabilities of all samples by means of the LR-WaveNet prediction model according to time sequence; and giving the probability of surge that data with noise points changes over time by means of the LR-WaveNet prediction model, to test the anti-interference performance of the model.

2 Claims, 6 Drawing Sheets

(56) References Cited

FOREIGN PATENT DOCUMENTS

| CN | 110608187 B | * | 8/2024 | ........... | F04D 27/001 |
|---|---|---|---|---|---|
| EP | 1256726 A1 | | 11/2002 | | |

OTHER PUBLICATIONS

Hongyang Zhao, Fuxiang Quan, Weiguo Xia and Ximing Sun, "Detection of Spike-type Stall of Axial Compressors Based on Dilated Causal Convolutional Neural Networks" Journal of Physics: Conference Series, vol. 1693, Sep. 25-27, 2020. (Year: 2020).*

Brownlee, Jason, "A Gentle Introduction to the Fbeta-Measure for Machine Learning" (https://machinelearningmastery.com/fbeta-measure-for-machine-learning/) Jan. 14, 2020 (Year: 2020).*

Zhongyang et al, "Research on Hybrid Parallel Algorithm in Detection of Rotating Stall", 2016, 2016 2nd IEEE International Conference on Computer and Communications, pp. 1217-1221. (Year: 2016).*

Lin et al, "A Stall Warning Scheme for Aircraft Engines With Inlet Distortion via Deterministic Learning", 2018, IEEE Transactions On Control Systems Technology, vol. 26, No. 4, pp. 1468-1474. (Year: 2018).*

* cited by examiner

PREDICTION METHOD FOR STALL AND SURGE OF AXIAL COMPRESSOR BASED ON DEEP LEARNING

TECHNICAL FIELD

The present invention relates to a prediction method for stall and surge of an axial compressor based on deep learning, and belongs to the technical field of aeroengine modeling and simulation.

BACKGROUND

The problem of aerodynamic stability of a high-performance aeroengine mainly comes from a compressor, the workload capability and stability of the compressor are very important to the working efficiency and safety of the whole aeroengine, and the prediction of instability thereof has been a hot topic and difficult problem in the field of international aeroengines. Because of the high pressure ratio and high acceleration of a high pressure-ratio multi-stage axial compressor, the occurrence mechanism of instability inception is more complicated and rapidly changed. In addition, with the increase of the thrust weight ratio of a high-performance engine, the decrease of the number of compressor stages, and the increase of the single-stage pressure ratio, the compressor load is caused to become higher and higher so that the problem of engine flow instability becomes very prominent. Therefore, in order to adapt to the development trend of high-performance aeroengine technology, there is an urgent need to break through the technical difficulty of modeling and predicting flow instability of high pressure-ratio multi-stage axial compressors, that is, in the case where the system has an early small abnormal sign of rotating stall, the sign can be recognized before damage is cased to the system.

At present, the test method is mainly used to test and determine stall and surge, and this method can take into account the influence of various factors in an actual compressor operating state. By collecting dynamic pressure signals of the compressor in the process of instability, state characteristics of the signals are analyzed by means of time domain analysis, frequency domain analysis and temporal frequency analysis algorithms. The time domain analysis method has the advantages of simple algorithm, small calculation amount and high calculating speed, and is more convenient to use in engineering practice. However, the time domain analysis method is mainly based on the amplitude and power of the signals to make judgments, so the accuracy thereof is affected; and is greatly affected by noise and other external environments. The frequency analysis method is based on the stability of the signals, only can analyze the statistical characteristics of the signals from the frequency domain and cannot take into account the time domain, and in addition, the reliability thereof is affected under the condition of low signal-to-noise ratio.

SUMMARY

In view of the problems of low accuracy and poor reliability in the prior art, the present invention provides a prediction method for stall and surge of an axial compressor based on deep learning.

The technical solution of the present invention is as follows:

A prediction method for stall and surge of an axial compressor based on deep learning, comprising the following steps:

S1. Preprocessing data with stall and surge of an aeroengine, comprising the following steps:

S1.1. in order to ensure the objectivity of test results, partitioning a test data set and a training data set from experimental data before processing the experimental data;

S1.2. filtering pressure change data measured at all measure points in the training data set by a low-pass filter;

S1.3. down-sampling the filtered data, wherein because the surge frequency is between 3 Hz and 166 Hz, 10-fold down-sampling is conducted in order to meet the requirements of Nyquist sampling theorem;

S1.4. sharding time domain data according to the size of a time step and labeling each sharded sample; setting the time step to 256, setting a time window with a length of 256, sliding the time window over time domain data, sharding the domain data falling in the time window as a sample; and assigning a label of 1 or 0 to each sample depending on whether a surge occurs or not;

S1.5. partitioning the training data set into a training set and a validation in S1.1 set in a 4:1 ratio.

S2. Constructing an Logistic regression (LR) branch network module, comprising:

S2.1. extracting six time domain statistical characteristics in total of each sample, including variance, kurtosis, skewness, average value, minimum value and maximum value, and taking same as the input of the LR branch network module;

S2.2. setting up a single-layer neural network with a rectified linear unit(ReLU) activation function, wherein the number of neurons of an input layer is 6 and a number of neurons of the output layer is 1, obtaining the output of the LR branch network module, a dimension thereof being (m,1), where m represents a number of samples.

S3. Constructing a WaveNet branch network module, comprising:

S3.1. adjusting the dimension of each sample to (n_steps, 1), and taking same as the input of the WaveNet branch network module, where n_steps represents time steps;

S3.2. setting up a dilated convolution module based on causal convolution and dilated convolution, and setting two identical dilated convolution modules; introducing gated activations into each layer of convolution to adjust the information transmitted to the next layer, adopting residual connections between one layer and another layer to prevent the gradient from disappearing, adopting skip connections to reserve an output of each convolutional layer, and summatingchar output characteristics of all layers to obtain the output characteristics of the dilated convolution module;

S3.3. fully connecting the characteristics extracted by the dilated convolution module by multiple layers, and activating by means of the ReLU activation function to obtain the output of the WaveNet branch network module, a dimension thereof being (m,1).

S4. Constructing an LR-WaveNet prediction model, comprising:

S4.1. fusing the two branch network modules by means of a stacking algorithm, splicing the outputs of the LR branch network module and the WaveNet branch network module, obtaining a fusion output of which the dimension is (m,2), and taking a same input of a stacking fusion module;

S4.2. setting up a stacking fusion module, activating the output by means of two layers of neural network plus sigmoid to obtain a probability of surgeLR-WaveNet prediction model;

S4.3. for a problem existing in the training of data with stall and surge, designing a modified focal loss (MFL) function wherein the traditional cross entropy loss function is:

$$L(p) = \begin{cases} -\log(p) & \text{if } y = 1 \\ -\log(1-p) & \text{if } y = 0 \end{cases}$$

where L represents cross entropy loss; p represents a prediction probability; y represents a real label of a sample.

For the sake of convenience, defining a model prediction probability $p_t$ as:

$$p_t = \begin{cases} p & \text{if } y = 1 \\ 1-p & \text{if } y = 0 \end{cases}$$

Thus, the cross entropy loss function $L(p_t) = -\log(p_t)$.

First, for class imbalance, introducing a coefficient $\alpha$, $\alpha \in [0,1]$, the larger the proportion of the samples of class 1 in all samples, the smaller the $\alpha$, defining a class weight coefficient $\alpha_t$ as:

$$\alpha_t = \begin{cases} \alpha & \text{if } y = 1 \\ 1-\alpha & \text{if } y = 0 \end{cases}$$

at this moment, the cross entropy loss function $L(p_t) = -a_t \log(p_t)$.

Then, for different impact caused by mistake classification, introducing a coefficient $\beta$, $\beta \in [0,1]$, where $\beta$ represents the magnitude of the impact of the mistake classification of the samples of class 1 (surge), defining a weight coefficient of importance degree $\beta_t$ as:

$$\beta_t = \begin{cases} \beta & \text{if } y = 1 \\ 1-\beta & \text{if } y = 0 \end{cases}$$

at this moment, the cross entropy loss function $L(p_t) = -a_t \beta_t \log(p_t)$.

Finally, for easy/hard sample imbalance, introducing a regulatory factor $(1-p_t)^\gamma$, where a parameter $\gamma \geq 0$, the easier the sample, the closer the $p_t$ to 1, the closer the regulatory factor to 0, thereby reducing the contribution of the easy sample to the loss value.

The final improved focusing loss function is:

$$MFL(p_t) = -\alpha_t \beta_t (1-p_t)^\gamma \log(p_t)$$

where MFL represents modified focal loss, $\alpha_t$ represents a class weight coefficient, $\beta_t$ represents a weight coefficient of importance degree, $p_t$ represents a model prediction probability, and $\gamma$ represents a regulatory factor parameter.

S4.4. Based on the modified focal loss function, updating a weight of a model on the training set, specifically:

the output of an output layer of the WaveNet branch network module is:

$$\alpha^{(L)} = f(z^{(L)}) = f(W^{(L)} x^{(L)} + b^{(L)})$$

where L represents the output layer of the WaveNet branch network module; $W^{(L)}$ represents connection weight; $b^{(L)}$ represents bias; $x^{(L)}$ represents input of the output layer; $z^{(L)}$ represents a result of $x^{(L)}$ after linear transformation; $f()$ represents a second ReLU activation function; and $a^{(L)}$ represents the output layer of the WaveNet branch network module.

The the output layer of the LR branch network module is:

$$\alpha^{(LR)} = f(z^{(LR)}) = f(W^{(LR)} x^{(LR)} + b^{(LR)})$$

where LR represents the output layer of the LR branch network module; $W^{(LR)}$ represents connection weight; $b^{(LR)}$ represents bias; $x^{(LR)}$ represents an input characteristic of the branch neural network; $z^{(LR)}$ represents a result of $x^{(LR)}$ after linear transformation; $f()$ represents the ReLU activation function; and $a^{(LR)}$ represents output of the output layer of the LR branch network module.

Splicing the outputs of the two branch network modules:

$$\alpha^{(L')} = [\alpha^{(L)}, \alpha^{(LR)}]$$

$$z^{(L')} = [z^{(L)}, z^{(LR)}]$$

where L' represents a new layer after the outputs of the two branch network modules are spliced, $a^{(L')}$ represents output of a splicing layer, and $z^{(L')}$ represents input of an activation function of the splicing layer.

The input of the stacking fusion module is $x^{(L+1)} = \alpha^{(L')}$, the final output $\alpha^{(L+2)}$ of the LR-WaveNet prediction model is obtained through two layers of neural network, the output $\alpha^{(L+2)}$ of the model is substituted into the loss function, obtaining:

$$J(W,b) = -\alpha_t \beta_t (1-p_t)^\gamma \log(p_t)$$

where J represents a loss value, W and b respectively represent a weight coefficient and a deviation coefficient of model, and:

$$p_t = \begin{cases} a^{(L+2)} & \text{if } y = 1 \\ 1 - a^{(L+2)} & \text{if } y = 0 \end{cases}$$

an error of the output layer of the LR-WaveNet prediction model is $$\frac{\partial}{\partial z^{(L+2)}} J(W, b),$$

where $z^{(L+2)}$ represents the input of the activation function of the output layer of the LR-WaveNet prediction model. Conducting back propagation on anerror of the output layer of the LR-WaveNet prediction model according to a back propagation formula, obtaining that an error on the output layer of the WaveNet branch network module is:

$$\delta_1^{(L')} = \left( \sum_{j=1}^{s_{L+1}} W_{1j}^{(L')} \delta_j^{(L+1)} \right) f'(z^{(L)})$$

an error on the output layer of the LR branch network module is:

$$\delta_2^{(L')} = \left( \sum_{j=1}^{s_{L+1}} W_{2j}^{(L')} \delta_j^{(L+1)} \right) f'(z^{(LR)})$$

where $\delta_i^{(l)}$ represents an error of the loss function on the $i^{th}$ node of the $l^{th}$ layer; $W_{ij}^{(l)}$ represents a weight coefficient between a $j^{th}$ node of a $l^{th}$ layer and $ai^{th}$ node of a previous layer; $s_{l+1}$ represents the number of nodes of the $(l+1)^{th}$ layer.

Conducting back propagation on the branch networks respectively according to the errors on the output layers of the two branch network modules, and updating model parameters.

S4.5. Saving the trained model and testing on the validation set, adjusting a hyper-parameter of the model according to an evaluation index of the validation set, adopting an F2 index as an evaluation index, saving a model which makes the evaluation index optimal, obtaining a final LR-WaveNet prediction model;

wherein the F2 index is:

$$F2\text{-score} = \frac{2*P*R}{\beta*P+R};$$

where P represents precision, which represents the proportion of the samples really belonging to the positive class to the samples classified into the positive class:

$$P = \frac{TP}{TP+FP},$$

TP represents true positive numbers, FP represents false positive numbers; R represents recall, which represents the proportion of the samples belonging to the positive class correctly predicted to all the samples:

$$R = \frac{TP}{TP+FN},$$

TP represents true positive numbers, FP represents false positive numbers.

S5. Conducting real-time prediction on test data:
  S5.1. preprocessing test set data according to the steps of S1, and adjusting data dimensions according to input requirements of the LR-WaveNet prediction model;
  S5.2. giving surge prediction probabilities of all samples by means of the LR-WaveNet prediction model according to a time sequence;
  S5.3. intercepting a segment of data without surge inception from the test data, adding a segment of noise points to the segment of data, and giving a probability of surge that noise point data changes over time by means of the LR-WaveNet prediction model, to test an anti-interference performance of the model.

The present invention has the advantageous effects that compared with the previous method, when used to predict stall and surge of an engine, the method provided by the present invention integrates time domain statistical characteristics and change trends, thereby improving the prediction accuracy and having certain anti-interference performance. Meanwhile, the surge prediction probability is output by a model, classifying alarm is realized by setting a threshold, and the running state of the engine is adjusted according to the probability of surge, so that the method is beneficial to improving the active control performance of the engine. The method is based on data and is independent of the engine type, so the model can be conveniently migrated to different types of engines for use by training different data sets, and has certain universality.

DETAILED DESCRIPTION

Figure 1:
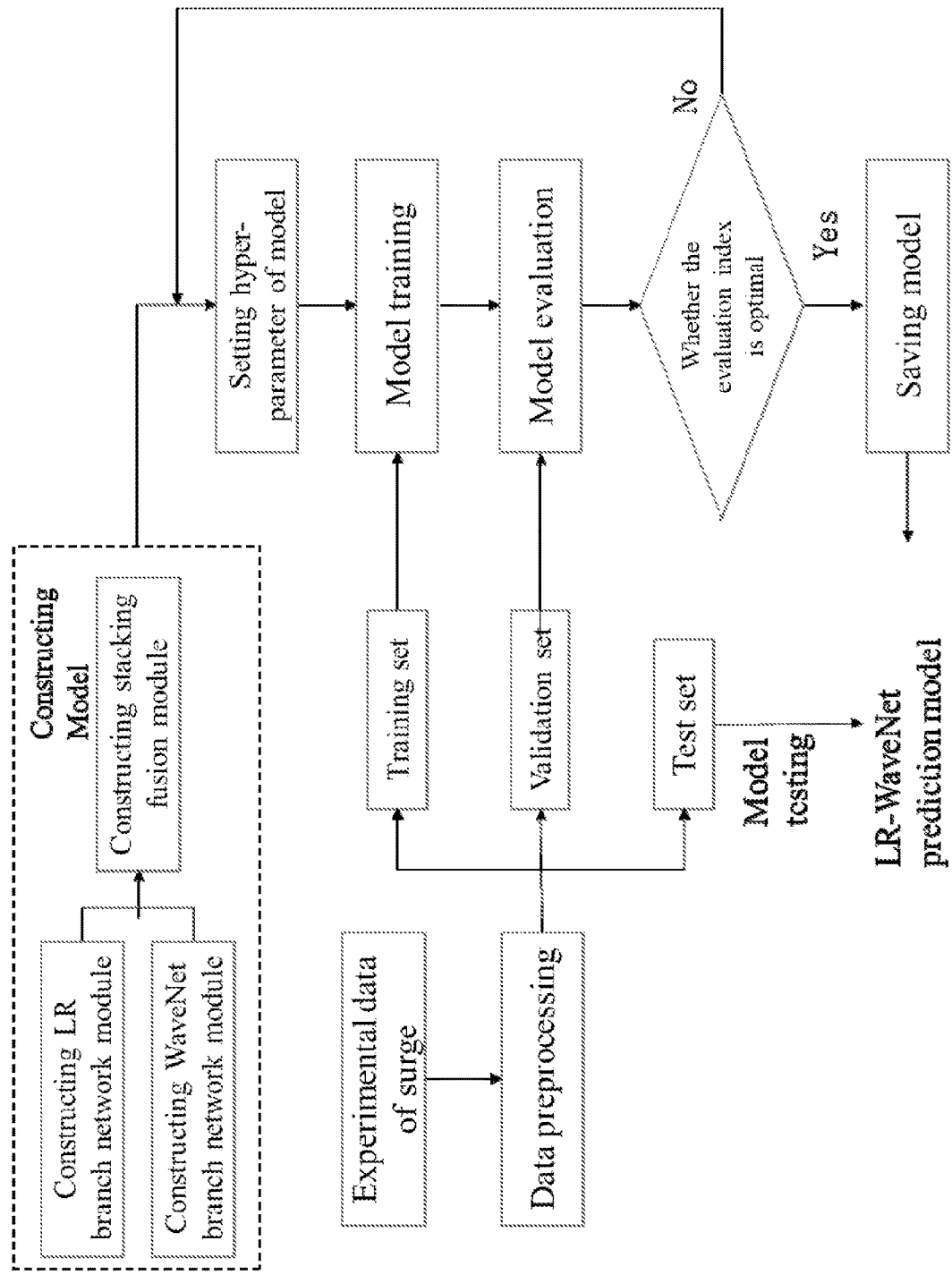
FIG. 1 is a flow chart of a prediction method for stall and surge of an axial compressor based on deep learning.

The present invention is further described below in combination with the drawings. The present invention replies on the background of experimental data of surge of a certain type of aeroengine. A flow of a prediction method for stall and surge of an axial compressor based on deep learning is shown in FIG. 1.

Figure 2:
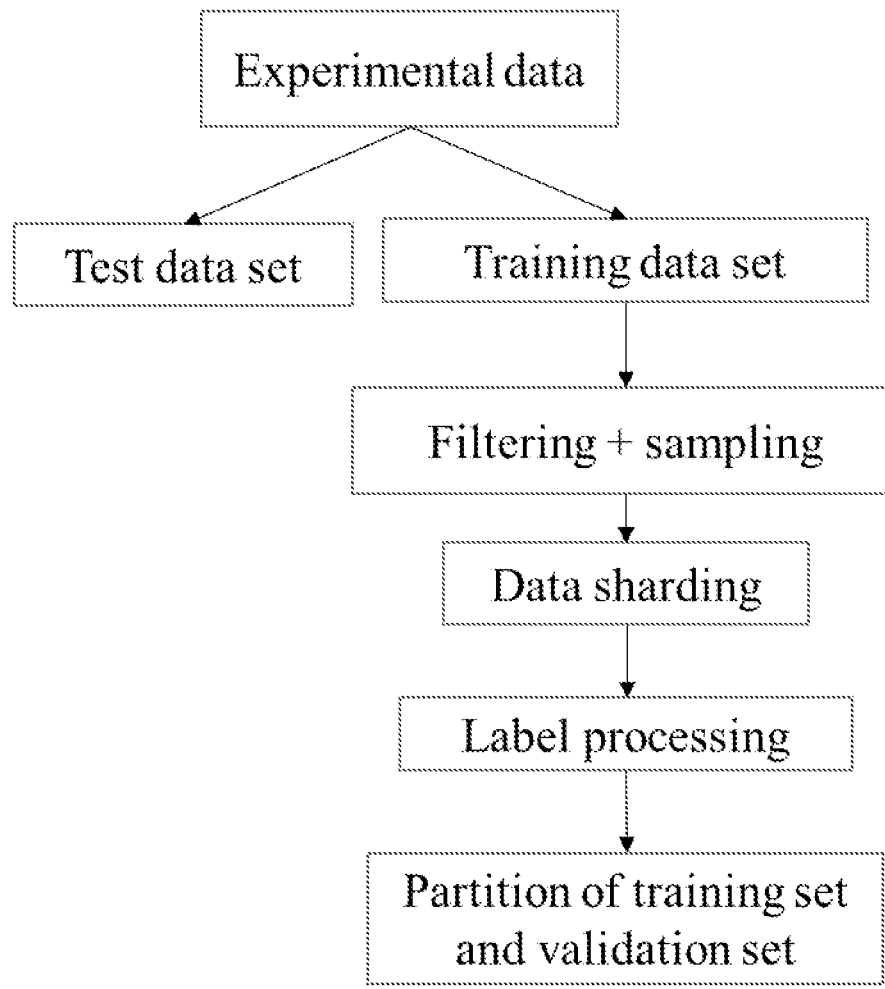
FIG. 2 is a flow chart of data preprocessing.

FIG. 2 is a flow chart of data preprocessing, the data preprocessing steps are as follows:
  S1. in order to ensure the objectivity of test results, partitioning a test data set and a training data set from experimental data before processing the experimental data, wherein 16 groups of experimental data are included in total, each group of experimental data contains dynamic pressure values measured at 10 measure points for 10 s from normal state to surge, the sensor measurement frequency is 6 kHz, and the 10 measure points are respectively located at the tip region of inlet guide vane, the tip region of 0-stage stator, the tip regions of 1-stage stators (three in circumferential direction), the tip region of 2-stage stator, the tip region of 3-stage stator, the tip region of 4-stage stator, the tip region of 5-stage stator, and the outlet wall;
  S2. filtering pressure change data measured at all measure points in the training data set by a low-pass filter;

S3. down-sampling the filtered data in order to reduce the calculation amount, wherein because the surge frequency is between 3 Hz and 166 Hz, 10-fold down-sampling is conducted in order to meet the requirements of Nyquist sampling theorem;

S4. sharding time domain data according to the size of a time step, wherein according to the observation of experimental data, the change period of spike-type stall inception is between 10 measure points and 200 measure points, setting the time step to 256 in order to ensure that the range of spike-type stall inception is included in each time step and the model operation efficiency is maximized; setting a time window with a length of 256, sliding the time window over time domain data, sharding the data falling in the time window as a sample; and assigning a label 1 or 0 to each sample depending on whether surge occurs or not;

S5. partitioning the training data set into a training set and validation set in a 4:1 ratio.

The steps of constructing an LR branch network module are as follows:

S1. extracting six time domain statistical characteristics in total of each sample, including variance, kurtosis, skewness, average value, minimum value and maximum value, and taking same as the input of the LR branch network module;

S2. setting up a single-layer neural network with the ReLU activation function, wherein a number of neurons of an input layer is 6 and a number of neurons of the output layer is 1, obtaining the output of the LR branch network module, a dimension thereof being (m, 1), where m represents a number of samples.

Figure 3:
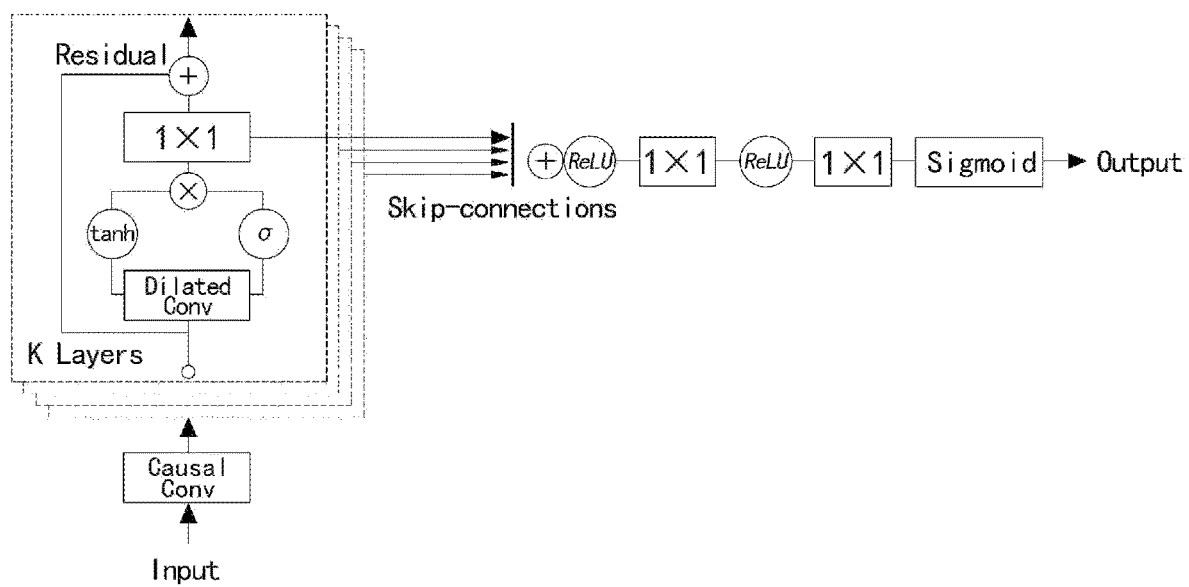
FIG. 3 is a structural diagram of a WaveNet branch network.

FIG. 3 is a structural diagram of a WaveNet branch network, and the steps of constructing the WaveNet branch network are as follows:

S1. Adjusting the dimension of each sample to (n_steps, 1), and taking same as the input of the WaveNet branch network module, where n_steps represents time steps.

S2. Setting up a dilated convolution module based on causal convolution and dilated convolution, and setting two identical dilated convolution modules in order to ensure that the receptive field reaches 256, wherein the maximum dilated factor of each dilated convolution module is 64, that is, dilated factors of the dilated convolutional layers are [1, 2, 4, . . . , 64, 1, 2, 4, . . . , 64] respectively; setting the width of each convolutional layer filter to 2, adopting 32 filters in each layer of convolution.

Introducing gated activations into each layer of convolution to adjust a information transmitted to a next layer, wherein gated activation means that the following gate structure is introduced into each layer of convolution:

$$z=\tanh(W_{f,k}*x) \odot \sigma(W_{g,k}*x)$$

where tanh( ) represents a hyperbolic tangent activation function, σ( ) represents a sigmoid activation function, □ represents a convolution operation, k represents number of layers, and $W_f$ and $W_g$ represent convolutional filters. After the input passes through the tanh function, the value can be compressed between −1 and 1 to adjust the network, and then the tanh output is multiplied by the sigmoid output to determine what information needs to be retained.

Adopting residual connections between one layer and the other layer to prevent the gradient from disappearing, wherein residual connection refers to the mapping of the input $x_l$ of the $l^{th}$ layer to the output by means of $x_{l+1}=f(x_l, w_l)+x_l$, rather than the traditional direct mapping $x_{l+1}=f(x_l, w_l)$.

A lower convolutional layer can influence a deeper layer only through the calculation of numerous middle layers so that the network can extract advanced characteristics from the original signals. For time series data, these advanced characteristics may be complex auto-regression components and trends, trajectories that are difficult for human eyes to recognize, etc. While obtaining these advanced characteristics, some low-level signals may also contain immediate useful characteristics and may be distorted after layer-by-layer calculation. Therefore, the output characteristics of all convolutional layer are retained by means of skip connections, and a set containing characteristics (rather than single advanced characteristics) extracted from all layers is finally obtained. The characteristics of all layers are summated to obtain the output characteristics of the dilated convolution module.

S3. Fully connecting the characteristics extracted by the convolution network layers by multiple layers, and activating by means of the ReLU activation function to obtain the output of the WaveNet branch network module, a dimension thereof being (m,1).

Figure 4:
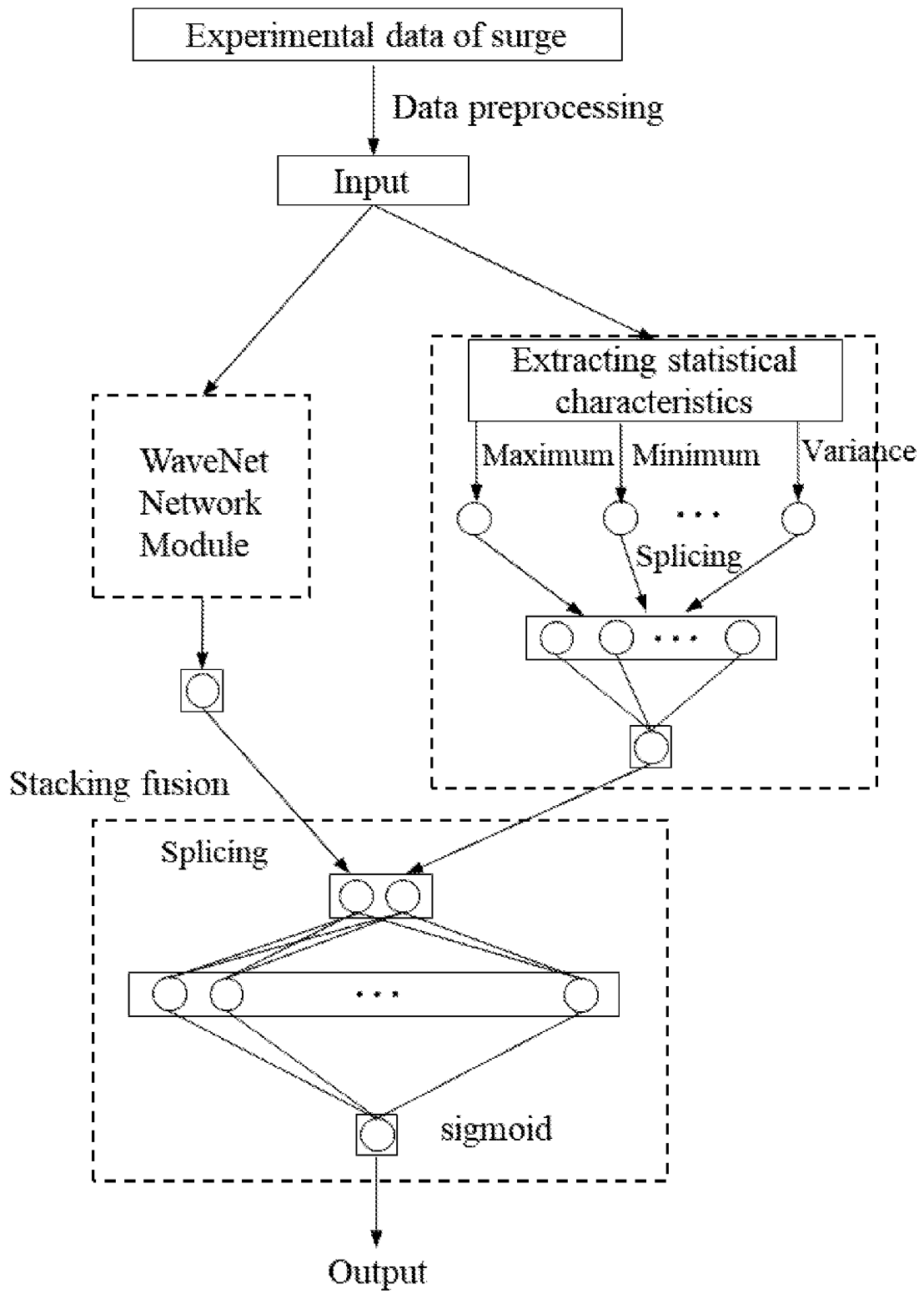
FIG. 4 is a structural diagram of an LR-WaveNet prediction model.

FIG. 4 is a structural diagram of an LR-WaveNet prediction model, and the steps of constructing the LR-WaveNet prediction model are as follows:

S1. splicing the outputs of the LR branch network module and the WaveNet branch network module, obtaining a fusion output of which the dimension is (m,2), and taking same an input of the stacking fusion module;

S2. setting up the stacking fusion module, activating the output by means of two layers of neural network plus sigmoid to obtain a probability of surge, i.e. an output of the LR-WaveNet prediction model;

S3. handling the following three problems in the training of data with stall and surge:

easy/hard sample imbalance: data are very stable before spike-type stall inception comes, and the data jitters violently after surge occurs, these samples are easy to classify and belong to easy samples, while the samples in the process from spike-type stall inception to surge are hard to classify because of having small fluctuation or having no fluctuation substantially;

class imbalance: numbers of samples in surge state and non-surge state are imbalanced;

different impact caused by mistake classification of different classes: as compared to the impact of classifying the non-surge state as surge state, the actual cost caused by the impact of mistakenly classifying surge state as non-surge state is far higher than the former.

In order to solve the above three problems, designing a modified focal loss (MFL) function.

wherein the traditional cross entropy loss function is:

$$L(p) = \begin{cases} -\log(p) & \text{if } y = 1 \\ -\log(1-p) & \text{if } y = 0 \end{cases}$$

where L represents cross entropy loss; p represents a prediction probability; y represents a real label of a sample. For the sake of convenience, defining a model prediction probability $p_t$ as:

$$p_t = \begin{cases} p & \text{if } y = 1 \\ 1-p & \text{if } y = 0 \end{cases}$$

Thus, the cross entropy loss function $L(p_t) = -\log(p_t)$.

First, for class imbalance, introducing a coefficient $\alpha$, $\alpha \in [0,1]$, the larger the proportion of the samples of class 1 in all samples, the smaller the $\alpha$, defining a class weight coefficient $\alpha_t$ as:

$$\alpha_t = \begin{cases} \alpha & \text{if } y = 1 \\ 1 - \alpha & \text{if } y = 0 \end{cases}$$

at this moment, the cross entropy loss function $L(p_t) = -\alpha \log(p_t)$.

Then, for different impact caused by mistake classification, introducing a coefficient $\beta$, $\beta \in [0,1]$, where $\beta$ represents the magnitude of the impact of the mistake classification of the samples of class 1 (surge), defining a weight coefficient of importance degree $\beta_t$ as:

$$\beta_t = \begin{cases} \beta & \text{if } y = 1 \\ 1 - \beta & \text{if } y = 0 \end{cases}$$

at this moment, the cross entropy loss function $L(p_t) = -\alpha_t \beta_t \log(p_t)$.

Finally, for easy/hard sample imbalance, introducing a regulatory factor $(1-p_t)^\gamma$, where a parameter $\gamma \geq 0$, the easier the sample, the closer the $p_t$ to 1, the closer the regulatory factor to 0, thereby reducing the contribution of the easy sample to the loss value.

The final modified focal loss function is:

$$MFL(p_t) = -\alpha_t \beta_t (1-p_t)^\gamma \log(p_t)$$

where MFL represents modified focal loss, $\alpha_t$ represents a class weight coefficient, $\beta_t$ represents a weight coefficient of importance degree, $p_t$ represents a model prediction probability, and $\gamma$ represents a regulatory factor parameter.

S4. Based on the modified loss function, updating the weight.

The output of the output layer of the WaveNet branch network module is:

$$\alpha^{(L)} = f(z^{(L)}) = f(W^{(L)} x^{(L)} + b^{(L)})$$

where L represents the output layer of the WaveNet branch network module; $W^{(L)}$ represents connection weight; $b^{(L)}$ represents bias; $x^{(L)}$ represents input of the output layer; $z^{(L)}$ represents a result of $x^{(L)}$ after linear transformation; $f(\ )$ represents the ReLU activation function; and $\alpha^{(L)}$ represents output of the output layer of the WaveNet branch network module.

The output of the output layer of the LR branch network module is:

$$\alpha^{(LR)} = f(z^{(LR)}) = f(W^{(LR)} x^{(LR)} + b^{(LR)})$$

where LR represents the output layer of the LR branch network module; $W^{(LR)}$ represents connection weight; $b^{(LR)}$ represents bias; $x^{(LR)}$ represents an input characteristic of the branch neural network; $z^{(LR)}$ represents a result of $x^{(LR)}$ after linear transformation; $f(\ )$ represents the ReLU activation function; and $\alpha^{(LR)}$ represents output of the output layer of the LR branch network module.

Splicing the outputs of the two branch network modules:

$$\alpha^{(L')} = [\alpha^{(L)}, \alpha^{(LR)}]$$

$$z^{(L')} = [z^{(L)}, z^{(LR)}]$$

where L' represents a new layer after the outputs of the two branch network modules are spliced, $\alpha^{(L')}$ represents output of a splicing layer, and $z^{(L')}$ represents an input of an activation function of the splicing layer.

The input of the stacking fusion module is $x^{(L+1)} = \alpha^{(L')}$, the final output $\alpha^{(L+2)}$ of the LR-WaveNet prediction model is obtained through two layers of neural network, the output $\alpha^{(L+2)}$ of the model is substituted into the modified focal loss function, obtaining:

$$J(W, b) = -\alpha_t \beta_t (1-p_t)^\gamma \log(p_t)$$

where J represents a loss value, W and b respectively represent a weight coefficient and a deviation coefficient of model, and:

$$p_t = \begin{cases} a^{(L+2)} & \text{if } y = 1 \\ 1 - a^{(L+2)} & \text{if } y = 0 \end{cases}$$

Taking a derivative of the input, i.e. $z^{(L+2)}$, of the activation function of the output layer of the model by means of the modified focal loss function:

$$\frac{\partial}{\partial z^{(L+2)}} J(W, b) = \frac{\partial J(W, b)}{\partial p_t} \frac{\partial p_t}{\partial a^{(L+2)}} \frac{\partial a^{(L+2)}}{\partial z^{(L+2)}}$$

where:

$$\frac{\partial J(W, b)}{\partial p_t} = \alpha_t \beta_t \gamma (1 - p_t)^{\gamma-1} / p_t$$

$$\frac{\partial p_t}{\partial a^{(L+2)}} = (-1)^{y+1}$$

$$\frac{\partial a^{(L+2)}}{\partial z^{(L+2)}} = \sigma'(z^{(L+2)})$$

therefore:

$$\frac{\partial}{\partial z^{(L+2)}} J(W, b) = (-1)^{y+1} \sigma'(z^{(L+2)}) \alpha_t \beta_t \gamma (1 - p_t)^{\gamma-1} / p_t$$

defining $\delta_t^{(l)}$ which represents an error of the loss function on the $i^{th}$ of the $l^{th}$ layer:

$$\delta_i^{(l)} = \frac{\partial}{\partial z_i^{(l)}} J(W, b) = \sum_{j=1}^{s_{l+1}} \left( \frac{\partial J(W, b)}{\partial z_j^{(l+1)}} \frac{\partial z_j^{(l+1)}}{\partial z_i^{(l)}} \right)$$

where $s_{l+1}$ represents the number of nodes of the $(l+1)^{th}$ layer, $z_t^{(l)}$ represents an input of the activation function of the $l^{th}$ layer, and $$\frac{\partial z_j^{(l+1)}}{\partial z_i^{(l)}} = \frac{\partial \left( W_{ij}^{(l)} x^{(l+1)} + b_j^{(l+1)} \right)}{\partial z_i^{(l)}} = \frac{\partial \left( W_{ij}^{(l)} a^{(l)} + b_j^{(l+1)} \right)}{\partial z_i^{(l)}} = W_{ij}^{(l)} \frac{\partial a_i^{(l)}}{\partial z_i^{(l)}}$$

Recurring layer by layer through $$\delta^{(L+2)} = \frac{\partial}{\partial z^{(L+2)}} J(W, b),$$

obtaining $$\delta_1^{(L')} = \left(\sum_{j=1}^{s_{L+1}} W_{1j}^{(L')} \delta_j^{(L+1)}\right) \frac{\partial a_1^{(L')}}{\partial z_1^{(L')}}$$

where:

$$\frac{\partial a_1^{(L')}}{\partial z_1^{(L')}} = \frac{\partial a^{(L)}}{\partial z^{(L)}} = f'(z^{(L)})$$

$\delta_1^{(L')}$ represents an error of the loss function on the output layer of the WaveNet branch network module, therefore:

$$\delta^{(L)} = \delta_1^{(L')} = \left(\sum_{j=1}^{s_{L+1}} W_{1j}^{(L')} \delta_j^{(L+1)}\right) f'(z^{(L)})$$

In a similar way, an error of the loss function on the output layer of the LR branch network module is obtained:

$$\delta^{(LR)} = \delta_2^{(L')} = \left(\sum_{j=1}^{s_{L+1}} W_{2j}^{(L')} \delta_j^{(L+1)}\right) f'(z^{(LR)})$$

Conducting back propagation respectively according to the errors of the loss function on the output layers of the two branch network modules, and updating model parameters.

S5. Saving the trained model and testing on the validation set, adjusting a hyper-parameter of the model according to an evaluation index of the validation set, adopting an F2 index as an evaluation index:

$$F2\text{-score} = \frac{2*P*R}{\beta*P+R}$$

where P represents precision, which represents the proportion of the samples really belonging to the positive class to the samples classified into the positive class:

$$P = \frac{TP}{TP+FP}$$

R represents recall, which represents the proportion of the samples belonging to the positive class correctly predicted to all the samples:

$$R = \frac{TP}{TP+FN}$$

Because the loss caused by predicting positive class as negative class, i.e. predicting surge samples as non-surge samples is greater, the value of β is 4, increasing the importance of recall in evaluation index.

Saving a model which makes an evaluation index optimal, obtaining a final LR-WaveNet prediction model.

Figure 5:
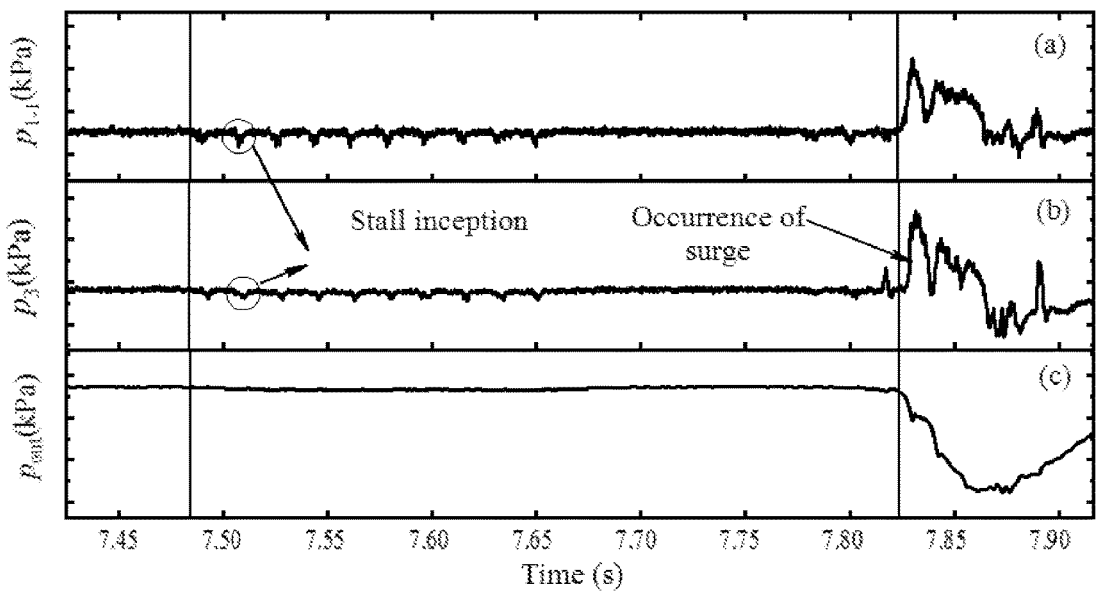
FIG. 5 is a diagram showing pressure change of a test set, wherein (a) is diagram showing that the dynamic pressure $p_{1\_1}$ of the tip region of 1-stage stator changes over time, (b) is diagram showing that the dynamic pressure $p_3$ of the tip region of 3-stage stator changes over time, and (c) is diagram showing that the dynamic pressure $p_{out}$ of the outlet wall changes over time.
Figure 6:
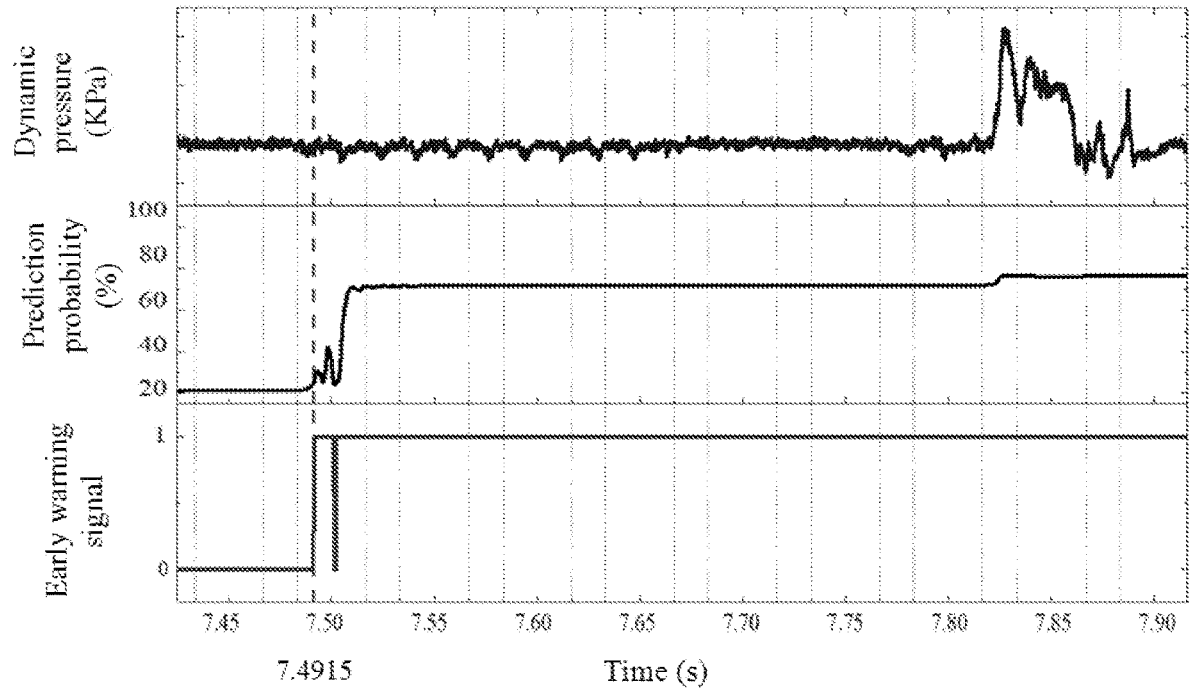
FIG. 6 is a diagram showing predicted results of the LR-WaveNet prediction model on the test data, wherein (a) is diagram showing that the dynamic pressure $p_{1\_1}$ of the tip region of 1-stage stator changes over time, (b) is diagram showing that the surge prediction probability given by the LR-WaveNet prediction model changes over time, and (c) is diagram showing an early warning signal given by the LR-WaveNet prediction model.
Figure 7:
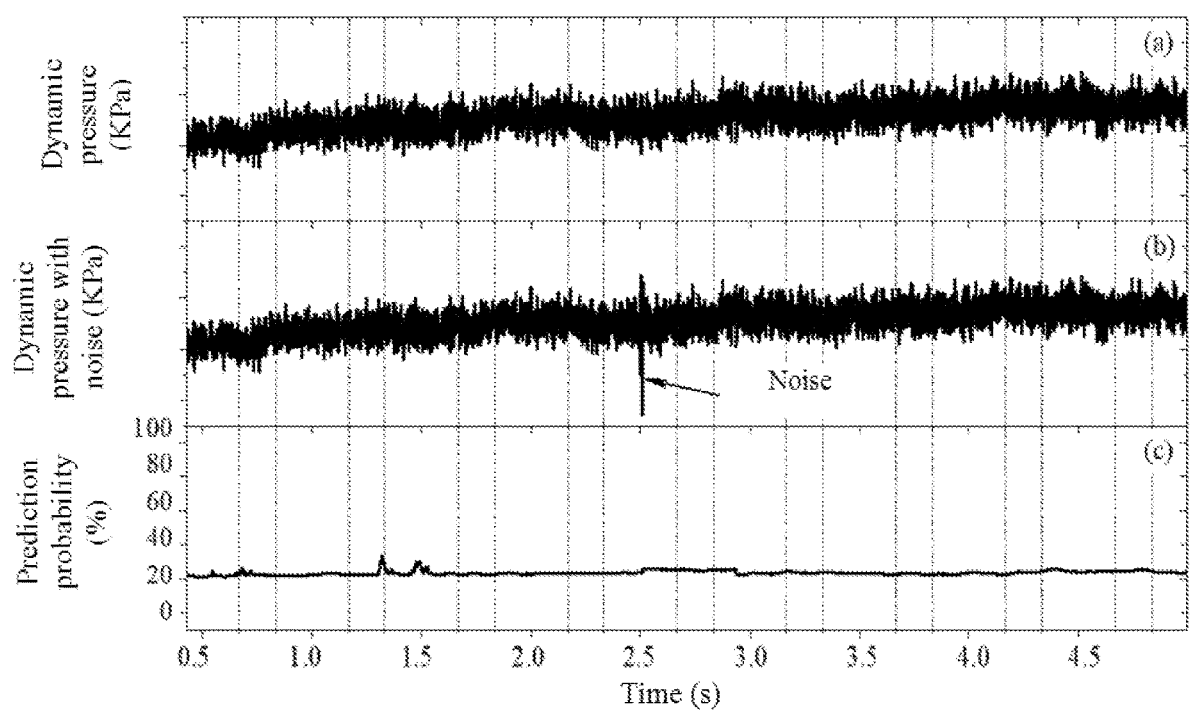
FIG. 7 is a test diagram showing anti-interference capability, wherein (a) is diagram showing that a segment of dynamic pressure without surge inception changes over time, (b) is diagram showing that the dynamic pressure after noise is added changes over time, and (c) is diagram showing that the surge prediction probability given by the LR-WaveNet prediction model on the dynamic pressure data with noise changes over time.

FIG. 5 is a diagram showing pressure change of a test set, wherein (a) is diagram showing that the dynamic pressure $p_{1-1}$ of the tip region of 1-stage stator changes over time, (b) is diagram showing that the dynamic pressure $p_3$ of the tip region of 3-stage stator changes over time, and (c) is diagram showing that the dynamic pressure $p_{out}$ of the outlet wall changes over time. FIG. 6 is a diagram showing predicted results of the LR-WaveNet prediction model on the test data, wherein (a) is diagram showing that the dynamic pressure $p_{1-1}$ of the tip region of 1-stage stator changes over time, (b) is diagram showing that the surge prediction probability given by the LR-WaveNet prediction model changes over time, and (c) is diagram showing an early warning signal given by the LR-WaveNet prediction model. FIG. 7 is a test diagram showing anti-interference capability, wherein (a) is diagram showing that a segment of dynamic pressure without surge inception changes over time, (b) is diagram showing that the dynamic pressure after noise is added changes over time, and (c) is diagram showing that the surge prediction probability given by the LR-WaveNet prediction model on the dynamic pressure data with noise changes over time. The steps of conducting real-time prediction on the test data are as follows:

S1. The three curves in the diagram showing pressure change of the test set respectively represent the changes of dynamic pressure values at the three measure points over time. As shown in the figure, a spike-type stall inception that develops downward appears at 7.48 s at the initial disturbance stage of stall, with the development of disturbance of stall, has violent fluctuation at 7.82 s, and thoroughly becomes into stall and surge. Preprocessing test set data according to the steps of data preprocessing, and adjusting data dimensions according to input requirements of the LR-WaveNet prediction model.

S2. Giving surge prediction probabilities of all samples by means of the LR-WaveNet prediction model according to a time sequence. By observing the diagram showing predicted results, it can be seen that the probability of surge is increased rapidly at the initial disturbance stage, and an early warning signals is given when the probability of surge exceeds a threshold, thereafter, the probability of surge is kept at a high value of 80%, and then the probability is increased to 100% when surge occurs. Therefore, the LR-WaveNet prediction model can make a response to small changes at the initial disturbance stage in time, and adjust the value of probability of surge according to the development of disturbance.

S3. Intercepting a segment of data without surge inception from the test data, adding a segment of noise points to the segment of data, giving a probability of surge that noise point data changes over time by means of the model. By observing the results in the test diagram showing anti-interference performance, because of not only paying attention to time domain statistical characteristics, but also paying attention to change trends in time steps, the LR-WaveNet prediction model is not sensitive to the suddenly appearing noise points and has certain anti-interference capability.

The invention claimed is:
1. A prediction method for stall and surge of an axial compressor based on deep learning, comprising the following steps:
  S1. preprocessing data with stall and surge of an aero-engine, comprising:
    S1.1. partitioning a test data set and a training data set from experimental data before processing the experimental data;
    S1.2. filtering pressure change data measured at all measure points in the training data set by a low-pass filter;
    S1.3. down-sampling the filtered pressure change data;

S1.4. sharding time domain data according to the size of a time step and labeling each sharded sample; setting the time step to be 256, setting a time window with a length of 256, sliding the time window over time domain data, sharding the time domain data falling in the time window as a sample; and assigning a label of 1 or 0 to each sample depending on whether a surge occurs or not;

S1.5. partitioning the training data set into a training set and a validation set in a 4:1 ratio;

S2. constructing a logistic regression (LR) branch network module, comprising:

S2.1. extracting six time domain statistical characteristics in total of each sample, including variance, kurtosis, skewness, average value, minimum value and maximum value, and taking same as the input of the LR branch network module;

S2.2. setting up a single-activation-layer neural network with the Rectified Linear Unit (ReLU) activation function, wherein a number of neurons of an input layer is 6 and a number of neurons of the output layer is 1, obtaining the output of the LR branch network module, a dimension thereof being (m,1), where m represents a number of samples being determined in S1.4;

S3. constructing a WaveNet branch network module, comprising:

S3.1. adjusting the dimension of each sample to (n_steps, 1), and taking same as the input of the WaveNet branch network module, where n_steps represents time steps;

S3.2. setting up a dilated convolution module based on causal convolution and dilated convolution, and setting two identical dilated convolution modules; introducing gated activations into each layer of convolution to adjust a information transmitted to a next layer, adopting residual connections between one layer and another layer to prevent a gradient from disappearing, adopting skip connections to reserve an output of each convolution layer, and summating output characteristics of all layers to obtain the output characteristics of the dilated convolution module;

S3.3. fully connecting the output characteristics extracted by the dilated convolution module by multiple layers, and activating by means of the ReLU activation function to obtain an output of the WaveNet branch network module, a dimension thereof being (m,1);

S4. constructing an LR-WaveNet prediction model, comprising:

S4.1. fusing the LR branch network module and the WaveNet branch network module by means of a stacking algorithm, splicing the outputs of the LR branch network module and the WaveNet branch network module, obtaining a fusion output of which the dimension is (m,2), and taking a same input of the stacking fusion module;

S4.2. setting up a stacking fusion module, activating an output by means of two layers of neural network plus sigmoid to obtain a probability of surge, which is used as an output of the LR-WaveNet prediction model;

S4.3. handling a problem existing in the training of data with stall and surge by means of a modified focal loss function,
wherein an improved focusing loss function is:

$$MFL(p_t) = -\alpha_t \beta_t (1-p_t)^\gamma \log(p_t)$$

where MFL represents modified focal loss, $\alpha_1$ represents a class weight coefficient, $\beta_1$ represents a weight coefficient of importance degree, $p_1$ represents a model prediction probability, and $\gamma$ represents a regulatory factor parameter;

S4.4. based on the modified focal loss function, updating a weight of a model on the training data set, specifically:
the output of an output layer of the WaveNet branch network module is:

$$a^{(L)} = f(z^{(L)}) = f(W^{(L)} x^{(L)} + b^{(L)})$$

where L represents the output layer of the WaveNet branch network module; $W^{(L)}$ represents connection weight; $b^{(L)}$ represents bias; $x^{(L)}$ represents input of the output layer; $z^{(L)}$ represents a result of $x^{(L)}$ after linear transformation; f( ) represents the ReLU activation function; and $a^{(L)}$ represents the output layer of the WaveNet branch network module;

the output of the output layer of the LR branch network module is:

$$a^{(LR)} = f(z^{(LR)}) = f(W^{(LR)} x^{(LR)} + b^{(LR)})$$

where LR represents the output layer of the LR branch network module; $W^{(LR)}$ represents connection weight; $b^{(LR)}$ represents bias; $x^{(LR)}$ represents an input characteristic of the branch neural network; $z^{(LR)}$ represents a result of $x^{(LR)}$ after linear transformation; f( ) represents a second ReLU activation function; and $a^{(LR)}$ represents the output of the LR branch network module;

splicing the outputs of the LR branch network module and the WaveNet branch network module:

$$a^{(L')} = [a^{(L)}, a^{(LR)}]$$

$$z^{(L')} = [z^{(L)}, z^{(LR)}]$$

where L' represents a new layer after the outputs of the two branch network modules are spliced, $a^{(L')}$ represents output of a splicing layer, and $z^{(L')}$ represents an input of an activation function of the splicing layer;

conducting back propagation on an error of the output layer of the LR-WaveNet prediction model according to a back propagation formula, obtaining that an error on the output layer of the WaveNet branch network module is:

$$\delta_1^{(L')} = \left( \sum_{j=1}^{s_{L+1}} W_{1j}^{(L')} \delta_j^{(L+1)} \right) f'(z^{(L)})$$

an error on the output layer of the LR branch network module is:

$$\delta_2^{(L')} = \left( \sum_{j=1}^{s_{L+1}} W_{2j}^{(L')} \delta_j^{(L+1)} \right) f'(z^{(LR)})$$

where $\delta_i^{(l)}$ represents an error of the modified focal loss function on the $i^{th}$ node of the $l^{th}$ layer; $W_{ij}^{(l)}$ represents a weight coefficient between a $j^{th}$ node of a $l^{th}$ layer and an ith node of the previous layer; $s_{l+1}$ represents a number of nodes of a $(l+1)^{th}$ layer;

conducting back propagation on the branch networks respectively according to errors on the output layers of the two branch network modules, and updating model parameters;

S4.5. saving the trained model and testing on the validation set, adjusting a hyper-parameter of the trained model according to an evaluation index of the validation set, adopting an F2 index as an evaluation index, and saving a model which makes an evaluation index optimal as a final LR-WaveNet prediction model;

S5. conducting real-time prediction on test data:

S5.1. preprocessing test set data according to the steps of S1, and adjusting data dimensions according to input requirements of the LR-WaveNet prediction model;

S5.2. giving surge prediction probabilities of all samples by means of the LR-WaveNet prediction model according to a time sequence;

S5.3. intercepting a segment of data without surge inception from the test set data, adding a segment of noise points to the segment of data, and giving a probability of surge that noise point data changes over time by means of the LR-WaveNet prediction model, to test an anti-interference performance of the model.

2. The prediction method for stall and surge of an axial compressor based on deep learning according to claim 1, wherein the F2 index is:

$$F2\text{-score} = \frac{2*P*R}{\beta*P+R},$$

where P represents precision, β represents actual cost, and R represents recall.

* * * * *